(12) United States Patent
Ishizaki

(10) Patent No.: US 8,185,565 B2
(45) Date of Patent: May 22, 2012

(54) INFORMATION PROCESSING APPARATUS, CONTROL METHOD, AND STORAGE MEDIUM

(75) Inventor: Tooru Ishizaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 530 days.

(21) Appl. No.: 12/271,060

(22) Filed: Nov. 14, 2008

(65) Prior Publication Data

US 2009/0132564 A1 May 21, 2009

(30) Foreign Application Priority Data

Nov. 16, 2007 (JP) ................................. 2007-298596
Sep. 11, 2008 (JP) ................................. 2008-233684

(51) Int. Cl.
*G06F 7/00* (2006.01)
(52) U.S. Cl. ........................................................ 707/809
(58) Field of Classification Search .................. 707/809, 707/999.101
See application file for complete search history.

(56) References Cited

U.S. PATENT DOCUMENTS

| | | | | |
|---|---|---|---|---|
| 6,470,306 | B1 * | 10/2002 | Pringle et al. ...................... | 704/3 |
| 6,529,285 | B2 * | 3/2003 | Bobrow et al. ............... | 358/1.12 |
| 6,886,130 | B1 * | 4/2005 | Unger et al. ................... | 715/207 |
| 7,350,199 | B2 * | 3/2008 | Ito et al. ......................... | 717/141 |
| 7,500,017 | B2 * | 3/2009 | Cseri et al. ...................... | 709/246 |
| 7,596,745 | B2 * | 9/2009 | Dignum et al. ............... | 715/234 |
| 7,756,906 | B2 * | 7/2010 | Mehta et al. .................. | 707/803 |
| 2003/0046317 | A1 * | 3/2003 | Cseri et al. ...................... | 707/513 |
| 2004/0143791 | A1 * | 7/2004 | Ito et al. ......................... | 715/513 |
| 2005/0278289 | A1 * | 12/2005 | Gauweiler et al. ................ | 707/1 |
| 2006/0117307 | A1 * | 6/2006 | Averbuch et al. .............. | 717/143 |
| 2007/0113172 | A1 * | 5/2007 | Behrens et al. ................ | 715/513 |
| 2007/0113222 | A1 * | 5/2007 | Dignum et al. ................ | 717/143 |
| 2007/0208752 | A1 * | 9/2007 | Khaladkar et al. .............. | 707/10 |
| 2008/0098001 | A1 * | 4/2008 | Gupta et al. ..................... | 707/10 |
| 2008/0115055 | A1 * | 5/2008 | Sadovsky et al. .............. | 715/255 |
| 2008/0288292 | A1 * | 11/2008 | Bi et al. ............................ | 705/3 |
| 2009/0037368 | A1 * | 2/2009 | Petride et al. ...................... | 707/2 |

FOREIGN PATENT DOCUMENTS

JP  2004-102430 A  4/2004
JP  2005-215951 A  8/2005

\* cited by examiner

*Primary Examiner* — Kimberly Wilson
*Assistant Examiner* — Mohammed R Uddin
(74) *Attorney, Agent, or Firm* — Canon USA Inc. IP Division

(57) ABSTRACT

An information processing apparatus for combining a plurality of structured documents, including an acquiring unit, for each of the plurality of structured documents, correspondence information showing a correspondence between vocabulary information and token information, and encoded information in which the vocabulary information included in the structured document has been replaced with corresponding token information, a replacing unit for, if the vocabulary information included in a first correspondence information is common with the vocabulary information included in a second correspondence information, replace the common vocabulary information with a reference to the common vocabulary information included in the second correspondence information, and a combining unit to generate combined information by combining the correspondence information and the encoded information, of each of the plurality of structured documents.

6 Claims, 15 Drawing Sheets

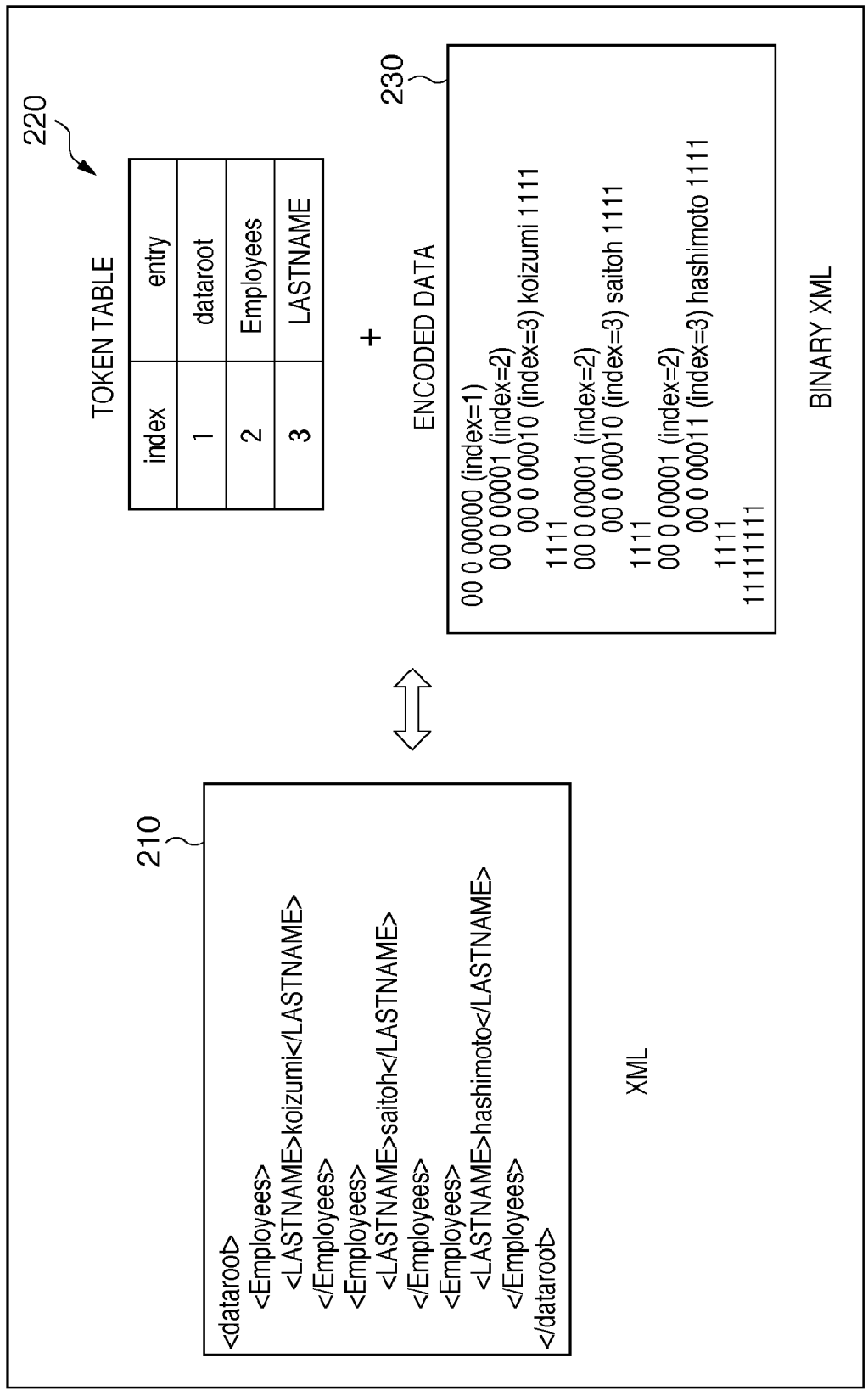

FIG. 5

DATA FORMAT CORRESPONDENCE TABLE

| FILE HEADER | FILE EXTENSION | MEDIA TYPE | DATA FORMAT |
|---|---|---|---|
| 0xe001 | finf | application/fastinfoset | Fast Infoset |
| | xml | application/xml | XML |
| ... | | | |

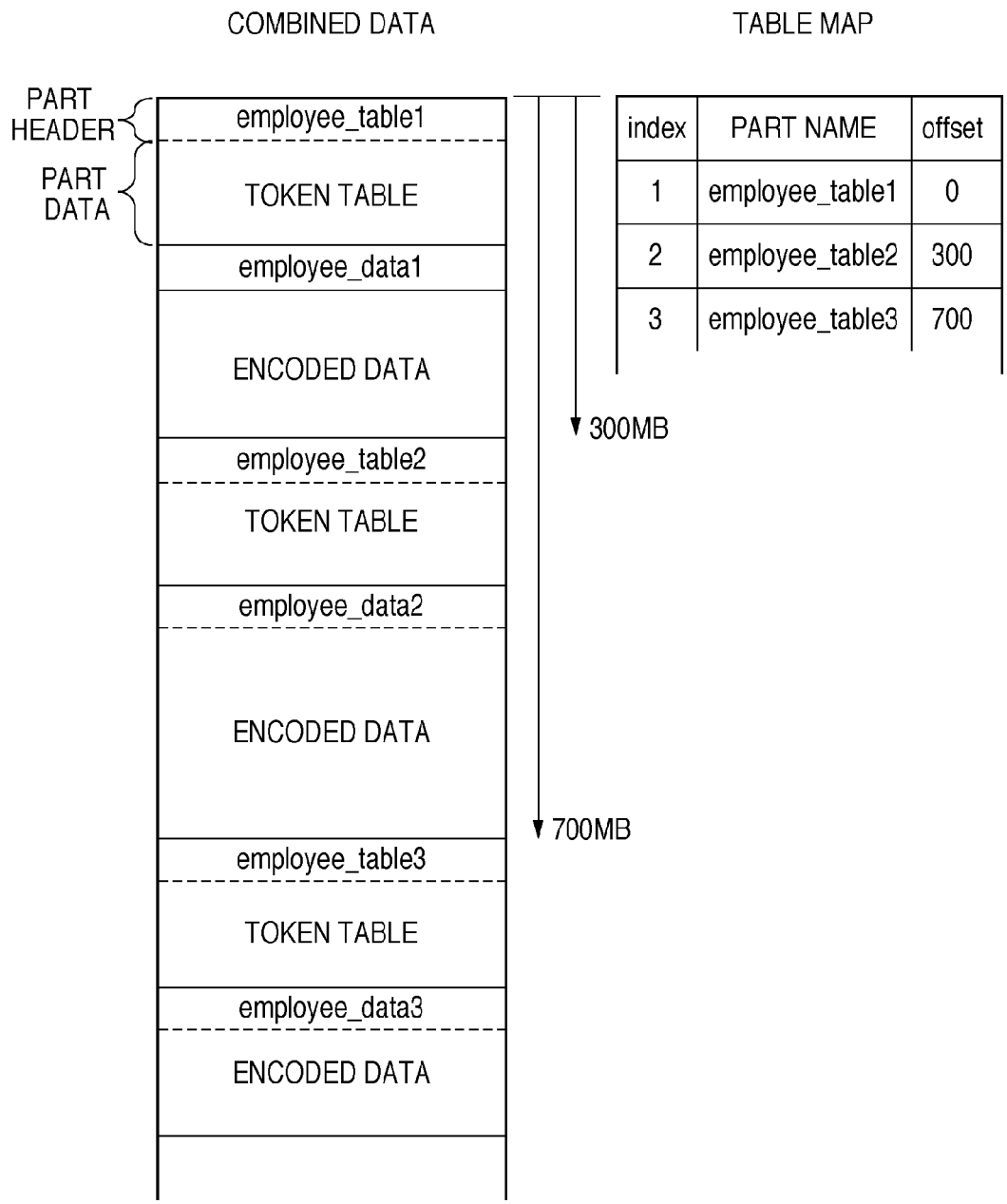

FIG. 7A

320 — employee_table1
```
<dataroot>
  <Employee>
    <LASTNAME>Koizumi</LASTNAME>
  </Employee>
  <Employee>
    <LASTNAME>Saitoh</LASTNAME>
  </Employee>
</dataroot>
```

INTO BINARY XML ⟹

710

| index | entry |
|---|---|
| 1 | dataroot |
| 2 | Employee |
| 3 | LASTNAME |
| 4 | Koizumi |
| 5 | Saitoh |

340 — employee_table2
```
<dataroot>
  <Employee2>
    <LASTNAME>Koizumi</LASTNAME>
    <AGE>30</AGE>
  </Employee2>
  <Employee2>
    <LASTNAME>Yamamoto</LASTNAME>
    <AGE>20</AGE>
  </Employee2>
</dataroot>
```

INTO BINARY XML ⟹

730

| index | entry |
|---|---|
| 1 | dataroot |
| 2 | Employee2 |
| 3 | LASTNAME |
| 4 | AGE |
| 5 | Koizumi |
| 6 | Yamamoto |

360 — employee_table3
```
<dataroot>
  <Employee3>
    <LASTNAME>koizumi</LASTNAME>
    <EmployeeNumber>0001</EmployeeNumber>
  </Employee3>
  <Employee3>
    <LASTNAME>Yamamoto</LASTNAME>
    <EmployeeNumber>0002</EmployeeNumber>
  </Employee3>
</dataroot>
```

INTO BINARY XML ⟹

750

| index | entry |
|---|---|
| 1 | dataroot |
| 2 | Employee3 |
| 3 | LASTNAME |
| 4 | EmployeeNumber |
| 5 | Koizumi |
| 6 | Yamamoto |

DATA TYPE DEFINITION

| index | DATA TYPE |
|---|---|
| 1 | base64 |
| 2 | hexadecimal |
| 3 | short |
| 4 | long |
| ⋮ | ⋮ |
| 15 | tokenref |

← NEW TYPE DEFINED

FIG. 9A employee_table1

| index | entry |
|---|---|
| 1 | dataroot |
| 2 | Employee |
| 3 | LASTNAME |
| 4 | Koizumi |
| 5 | Saitoh |

FIG. 9B employee_table2

| index | entry |
|---|---|
| 1 | dataroot |
| 2 | Employee2 |
| 3 | LASTNAME |
| 4 | AGE |
| 5 | Koizumi |
| 6 | Yamamoto |

REWRITE

| index | entry |
|---|---|
| 1 | 0f 01 |
| 2 | Employee2 |
| 3 | 0f 01 |
| 4 | AGE |
| 5 | 0f 01 04 |
| 6 | Yamamoto |

FIG. 9C employee_table3

| index | entry |
|---|---|
| 1 | dataroot |
| 2 | Employee3 |
| 3 | LASTNAME |
| 4 | EmployeeNumber |
| 5 | Koizumi |
| 6 | Yamamoto |

REWRITE

| index | entry |
|---|---|
| 1 | 0f 01 |
| 2 | Employee3 |
| 3 | 0f 01 |
| 4 | EmployeeNumber |
| 5 | 0f 01 04 |
| 6 | 0f 02 |

FIG. 11

TABLE MAP

| index | PART NAME | offset | REFERENCE TABLE |
|---|---|---|---|
| 1 | employee_table1 | 0 | 0x02 0x03 |
| 2 | employee_table2 | 300 | 0x03 |
| 3 | employee_table3 | 700 | |

FIG. 13A

```
employee_table4
<dataroot>
  <Employee>
    <LASTNAME>Koizumi</LASTNAME>
  </Employee>
  <Employee>
    <LASTNAME>Saitoh</LASTNAME>
  </Employee>
</dataroot>
```

⇑ INTO BINARY XML

| index | entry |
|---|---|
| 1 | dataroot |
| 2 | Employee |
| 3 | LASTNAME |
| 4 | Koizumi |
| 5 | Saitoh |

```
employee_table5
<dataroot>
  <Employee>
    Saitoh
  </Employee>
</dataroot>
```

⇑ INTO BINARY XML

| index | entry |
|---|---|
| 1 | dataroot |
| 2 | Employee |
| 3 | Saitoh |

+

```
00
  01 83 F
FF
```

FIG. 14A employee_table4

| index | entry |
|---|---|
| 1 | dataroot |
| 2 | Employee |
| 3 | LASTNAME |
| 4 | Koizumi |
| 5 | Saitoh |

+

```
00
  01
     02 83 FF
     01
        02 84 FF
FF
```

FIG. 14B employee_table5

| index | entry |
|---|---|
| 1 | dataroot |
| 2 | Employee |
| 3 | Saitoh |

+

```
00
  01 83 FF
FF
```

⇧ REWRITE

```
00
  01 85 F
FF
```

INFORMATION PROCESSING APPARATUS, CONTROL METHOD, AND STORAGE MEDIUM

BACKGROUND OF THE INVENTION

1. Field of the Invention

The present invention relates to an information processing apparatus, a control method thereof, a computer program, and a storage medium, and in particular to a technique for processing structured documents.

2. Description of the Related Art

Heretofore, with the XML language specifications set forth by W3C, encoding is typically performed with a character encoding scheme such as UTF-8 or UTF-16 when writing data in the XML language. Increased data size is a problem in this case, since data structures, integers, decimal values and the like are all written as characters.

In contrast, binary XML techniques such as the Fast Infoset (ISO/IEC 24824-1) specification set forth by ISO are known. Binary XML techniques involve encoding integers and decimal values using the original data type, and replacing data structures and values that are described repeatedly with tokens of short data length. Data size can thus be reduced.

However, the following problems arise with the foregoing method when combining a plurality of structured documents such as word processing documents. That is, with binary XML, description that appears repeatedly in a single structured document is standardized, but with word processing documents, description that is repeated over a plurality of structured documents cannot be standardized because the description is repeatedly used within each of the structured documents. Thus, even if binary XML is applied to word processing documents, redundancy occurs in repeated description, and the data size cannot be adequately reduced despite there being a considerable amount of repeated description as a whole.

One conceivable method of combating this involves providing common tokens in advance based on schema information, and using these common tokens throughout the plurality of structured documents. However, this method cannot be applied when schema cannot be defined in advance, or when integrating a plurality of structured documents. With the method that involves providing common tokens in advance based on schema information, tokens even have to be provided for actual structured document data that is little used. Further, providing common tokens for element values and attribute values based on schema information is not easy.

SUMMARY OF THE INVENTION

An embodiment of the present invention has been made in consideration of the above situation, and has as its object to provide a technique that enables redundancy of repeated description to be further reduced in the case where a plurality of structured documents are combined.

According to one aspect of the present invention, an information processing apparatus for combining a plurality of structured documents, comprises: an acquiring unit configured to acquire, for each of the plurality of structured documents, correspondence information showing a correspondence between vocabulary information constituting the structured document and token information, and encoded information in which the vocabulary information included in the structured document has been replaced with corresponding token information based on the correspondence information; a replacing unit configured to, if the vocabulary information included in a first correspondence information is common with the vocabulary information included in a second correspondence information, replace common vocabulary information included in the first correspondence information with a reference to the common vocabulary information included in the second correspondence information; and a combining unit configured to generate combined information by combining the correspondence information in which the common vocabulary information has been replaced and the encoded information, of each of the plurality of structured documents.

According to another aspect of the present invention, a control method of an information processing apparatus for combining a plurality of structured documents, comprises: acquiring, for each of the plurality of structured documents, correspondence information showing a correspondence between vocabulary information constituting the structured document and token information, and encoded information in which the vocabulary information included in the structured document has been replaced with corresponding token information based on the correspondence information; replacing, if the vocabulary information included in a first correspondence information is common with the vocabulary information included in a second correspondence information, common vocabulary information included in the first correspondence information with a reference to the common vocabulary information included in the second correspondence information; and generating combined information by combining the correspondence information in which the common vocabulary information has been replaced and the encoded information, of each of the plurality of structured documents.

Further features of the present invention will become apparent from the following description of exemplary embodiments (with reference to the attached drawings).

BRIEF DESCRIPTION OF THE DRAWINGS

FIG. 2 shows an exemplary ISO/ITU-T Fast Infoset.

FIG. 5 illustrates a data format correspondence table.

FIG. 6A is a schematic view showing exemplary combined data.

FIG. 6B is a schematic view showing an exemplary table map.

FIGS. 7A to 7C illustrate the correspondence between XML documents, token tables and encoded data.

FIG. 8 shows exemplary data type definitions.

FIGS. 9A to 9C illustrate the rewriting of token tables.

FIG. 11 illustrates a table map.

FIGS. 13A and 13B show exemplary document data to be combined.

FIGS. 14A and 14B show exemplary data that has been re-encoded in accordance with an allocation.

DESCRIPTION OF THE EMBODIMENTS

Embodiments according to the present invention will now be described in detail with reference to the accompanying drawings. The constituent elements shown in the embodiments are, however, merely illustrative, and are not intended to limit the scope of the present invention. Further, not all combinations of features described in the embodiments are essential for the present invention.

Embodiment 1

Hardware Configuration

Figure 1:
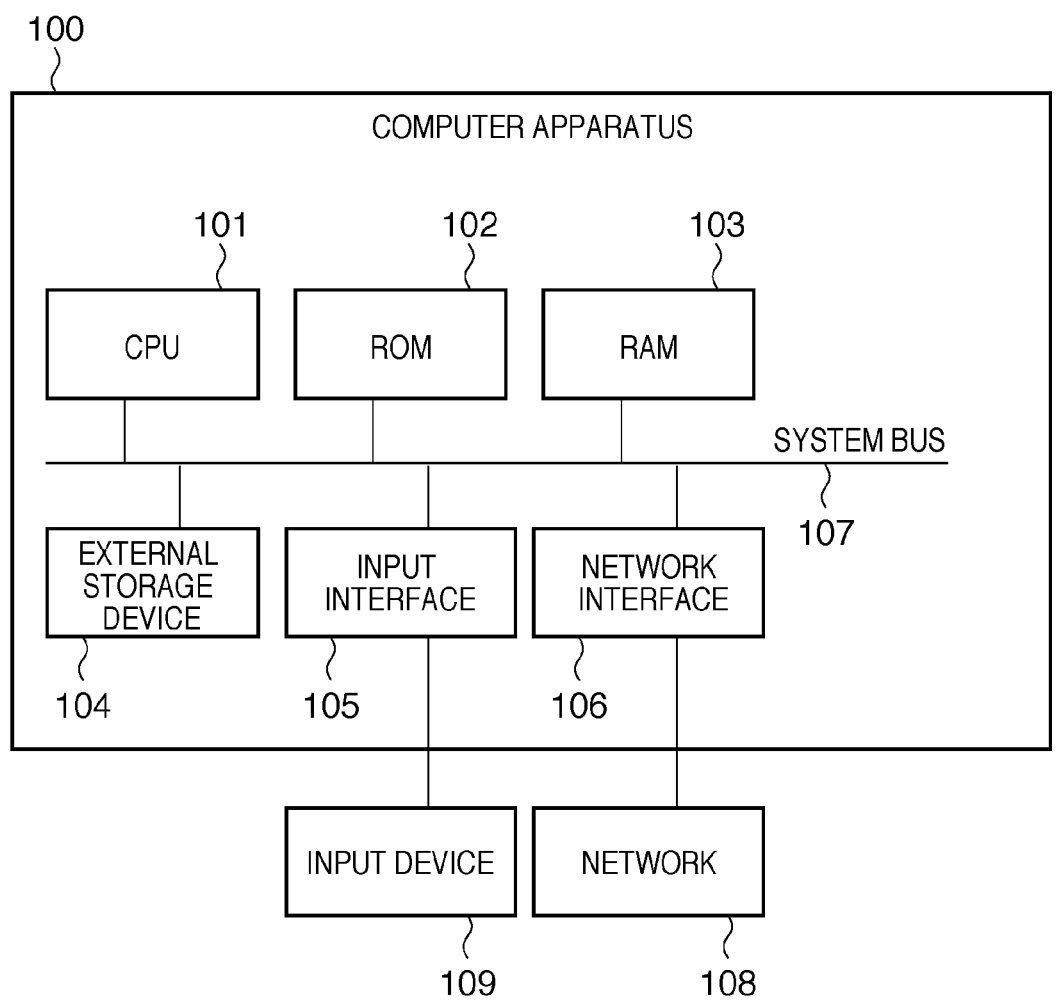
FIG. 1 is a block diagram showing the hardware configuration of a document data encoding apparatus.

The hardware configuration of a document data encoding apparatus serving as an information processing apparatus of the present embodiment will be described with reference to FIG. 1. FIG. 1 is a block diagram showing the hardware configuration of the document data encoding apparatus.

The document data encoding apparatus may be realized by a single computer apparatus, or may be realized by distributing the individual functions among a plurality of computer apparatuses provided according to need. If constituted by a plurality of computer apparatuses, the computer apparatuses are connected by a local area network (LAN) or the like so as to be mutually communicable.

Although realized by a personal computer (PC), the document data encoding apparatus serving as an information processing apparatus is not limited to this. For example, the document data encoding apparatus can be realized by an arbitrary device that performs information processing such as a work station (WS), a personal digital assistant (PDA), a mobile telephone, a digital camera, or a printer.

In FIG. 1, reference numeral 101 denotes a central processing unit (CPU) that performs overall control of the document data encoding apparatus 100. Reference numeral 102 denotes a read-only memory (ROM) that stores computer programs and parameters that do not require modification. Reference numeral 103 denotes a random access memory (RAM) that temporarily stores computer programs and data supplied from an external device or the like.

Reference numeral 104 denotes an external storage device, which in the present embodiment is realized by a hard disk fixedly installed in the document data encoding apparatus 100. The external storage device may, however, be realized by a memory card fixedly installed in the document data encoding apparatus 100, or a magnetic or optical card, an IC card, a memory card, or an optical disk such as a FD or a CD that is removable from the document data encoding apparatus 100. Note that FD stands for flexible disk, and CD stands for compact disk.

Reference numeral 105 denotes an interface with an input device 109 that receives user operations. The input device 109 is realized, for example, by a pointing device, a keyboard or the like for inputting data.

Reference numeral 106 denotes a network interface for connecting to a network line 108 such as the Internet. Reference numeral 107 denotes a system bus that communicably connects the individual units 101 to 106.

Exemplary Binary XML

There are demands for a reduction in XML data size with devices having limited hardware resources such as mobile telephones, digital cameras and printers. Binary XML has conventionally been used as a technique for realizing such demands. Binary XML is an XML document that has been converted to binary information, with data volume being reduced by allocating tokens of very short data length to portions of XML that have repeated description.

An exemplary binary XML will be described with reference to FIG. 2. FIG. 2 shows an exemplary ISO/ITU-T Fast Infoset document, which is one type of binary XML.

In FIG. 2, indexes are assigned as tokens in a token table 220 to the vocabularies "dataroot", "Employees" and "LASTNAME" in an XML document 210. A binary XML encoder creates encoded data 230 based on this token table 220. Incidentally, the token table provides correspondence information showing the correspondence between vocabulary information constituting the structured document and token information.

For example, the dataroot element is encoded as "00" representing an element, "0" representing an integer type, and "00000" representing an integer value. Given a 5-bit integer with a bias of 1 when the integer type is "0", the integer value will be 1, indicating "dataroot" of index 1. Encoded data such as 230 is created when similar encoding is performed on the other elements. The 4-bit 1111 shows an end tag element. Encoding into binary XML allows vocabulary that appears repeatedly to be represented with a short byte count and overall data volume to be reduced. Note that in FIG. 2, "(index=1)" to "(index=3)" in the encoded data 230 show the content represented by the respective 8-bit sequences on the immediate left thereof.

Figure 3A:
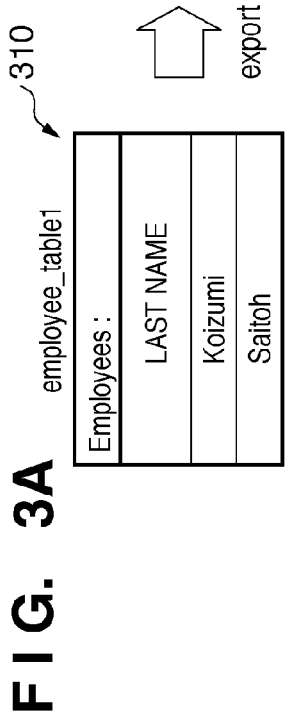
FIGS. 3A to 3C illustrate the exporting of table data to XML data.
Figure 3B:
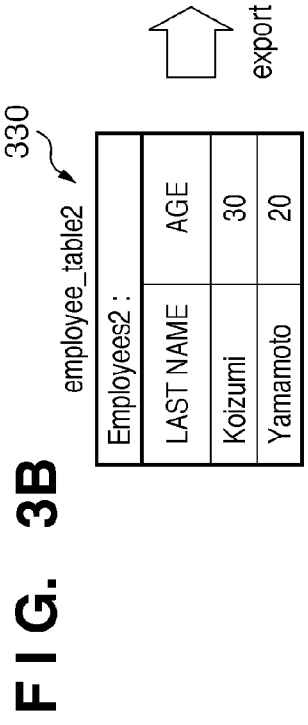
Figure 3C:
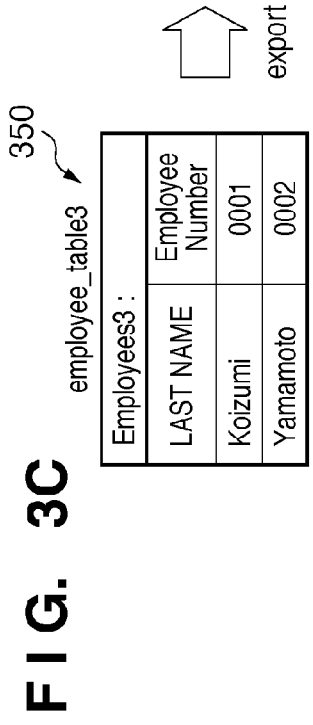

However, a problem occurs when the same format such as a word processing document is used repeatedly by a plurality of pieces of document data which are combined and saved as a single piece of data. This will be described with reference to FIGS. 3A, 3B and 3C. FIGS. 3A, 3B and 3C illustrate the exporting of table data created using table data creation software (e.g., Microsoft Access) to XML data.

In FIGS. 3A, 3B and 3C, table data 310, 330 and 350 are respectively associated with XML documents 320, 340 and 360. In FIGS. 3A, 3B and 3C, the vocabularies dataroot, LASTNAME, Koizumi and Yamamoto are used in a plurality of the XML documents.

There may be cases where it is desired to save table data thus created separately in combined form as a single piece of document data. With conventional binary XML, a token table and encoded data is created for each XML document. FIGS. 7A, 7B and 7C illustrate the correspondence between XML documents, token tables and encoded data. In the FIG. 7A example, a token table 710 and encoded data 720 are created for the XML document 320. Similarly, a token table 730 and encoded data 740 are created for the XML document 340 in the FIG. 7B example, and a token table 750 and encoded data 760 are created for the XML document 360 in the FIG. 7C example.

When combining this table data, the binary XMLs are simply inserted into respective parts of the combined document data. Such a method does not result in much size reduction in the case where it is desired to combine many pieces of table data such as in FIGS. 3A, 3B and 3C, since a great deal of repeated description remains in the combined data (combined information). For example, in the FIGS. 7A and 7B examples, indexes are separately assigned in the token tables 710 and 730 to the vocabularies dataroot, LASTNAME and Koizumi, despite these vocabularies being common to the XML documents 320 and 340, thus resulting in redundancy.

Binary XML Combining Process

In view of this, binary XML combining is performed in the present embodiment so as to enable the overall size to be reduced. That is, in the present embodiment, the same indexes are assigned to common vocabularies in the token tables acquired from the respective document data, when combining document data to generate combined data. The size of the combined data can thereby be reduced.

Figure 4:
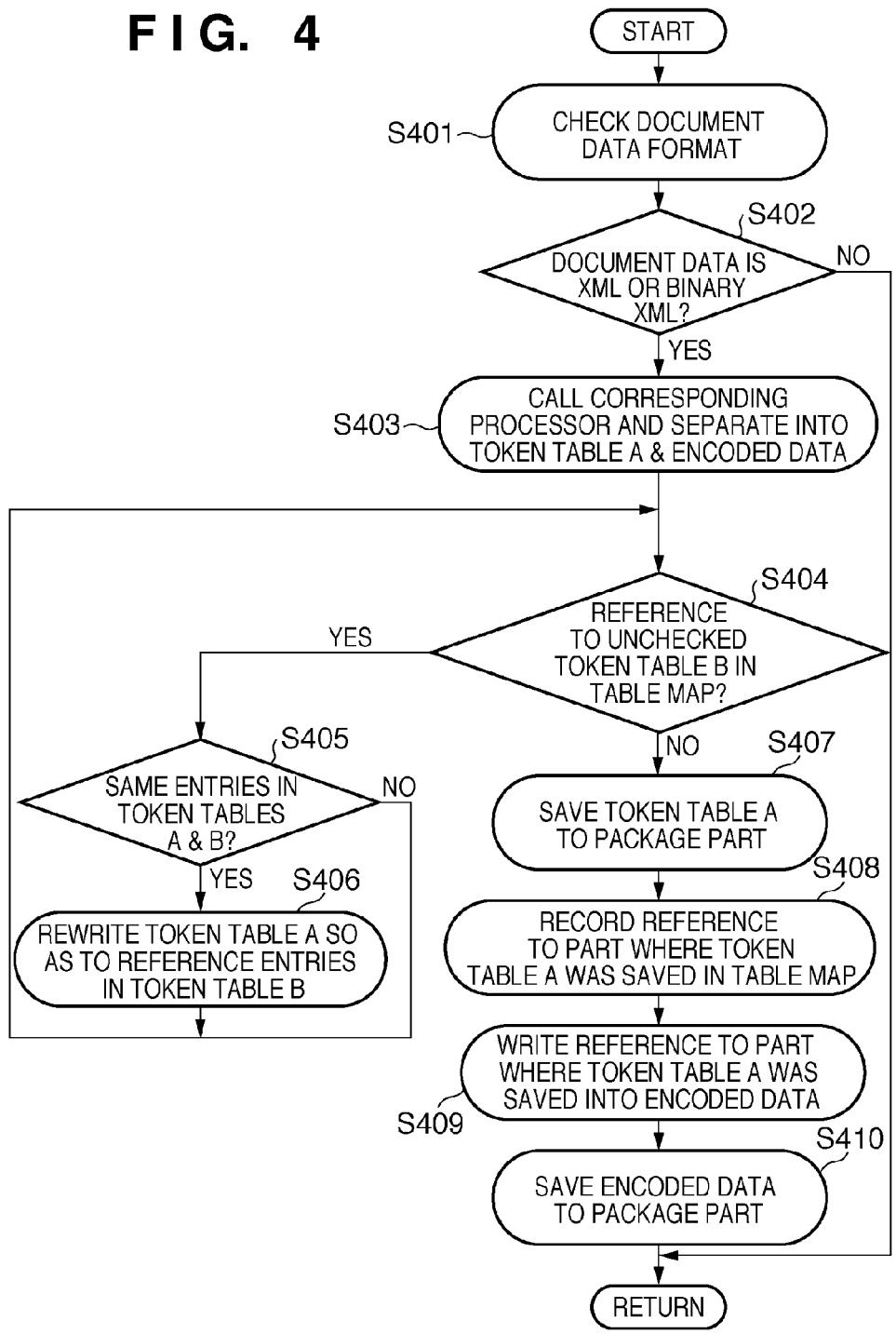
FIG. 4 is a flowchart showing the flow of a combining process of combining a plurality of binary XMLs.

FIG. 4 is a flowchart showing the flow of the combining process in the present embodiment, which is executed when combining a plurality of binary XMLs (e.g., FIGS. 7A, 7B, 7C). This process will now be described in accordance with the flow of FIG. 4. Note that the steps in FIG. 4 are executed as a result of the CPU 101 controlling the document data encoding apparatus 100.

Firstly, structured document data to be combined is sequentially input to the document data encoding apparatus 100.

Then, in step S401, the document data encoding apparatus 100 determines the format of the input document data. The format of the document data may be explicitly designated based on the application.

Alternatively, a correspondence table such as in FIG. 5 may be preregistered, and the data format may be determined from the file header, the file extension or the media type. Incidentally, FIG. 5 illustrates a data format correspondence table. It may be the case that the file header, file extension, media type and the like are prescribed for each data format, enabling the format of input document data to be automatically determined by looking at the file extension or message header. If the file extension of the document data is finf, for example, the data format of the document file can be determined to be Fast Infoset from the correspondence table of FIG. 5.

Next, in step S402, it is determined whether the data format determined at step S401 is XML or binary XML. If not XML or binary XML (step S402: NO), the processing returns to the main routine and a conventional combining process is performed. If XML or binary XML (step S402: YES), the processing proceeds to step S403.

In step S403, a token table and encoded data are acquired by separating the document data into a token table and encoded data (encoded information) using a corresponding processor. Corresponding processors may be implemented (regardless of hardware or software) in the document data encoding apparatus 100, or only an interface may be provided, with the corresponding processors being implemented on different devices.

If the document data is a binary XML document, encoded data and a token table are separated and acquired using a processor that operates as a binary XML decoder. If the XML document is a text document, a token table is acquired, and vocabulary information in the XML document is replaced with corresponding token information and encoded into binary XML using a processor that operates as a binary XML encoder. Assume that the token table acquired here is a token table A. In the case where document data is represented by 320 in FIG. 7A, for example, the token table 710 is acquired as a result of analyzing this document data. This process is executed for each of the plurality of input structured documents.

In steps S404 to S406, the token table is checked for redundancy. That is, the token table separated at step S403 (token table A) is compared with each token table combined in combined data as a result of processing performed to date to check for common vocabularies. As such, firstly, in step S404, it is determined whether there is a token table in the combined data that has yet to be compared with the token table A. If there is (step S404: YES), the processing proceeds to step S405, and if there is not (step S404: NO), the processing proceeds to step S407.

Note that in the present invention, the tables targeted for checking are recorded in a table map that serves as mapping information such as in FIG. 6B. Here, FIG. 6A is a schematic view showing exemplary binary XML combined data generated as a result of processing performed to date, while FIG. 6B is a schematic view showing an exemplary table map in which an offset from the head of the combined data and the like are described for each binary XML part.

Here, the offset from the head of the combined data shows the position of a structured document in the combined data. As in FIG. 6B, the table map shows, for each structured document, document identification information such as a document name identifying the structured document, and the position of the structured document. The document data encoding apparatus 100 generates a table map such as this for the plurality of structured documents targeted for processing.

In the FIGS. 6A and 6B example, three documents having the part names employee_table1, employee_table2 and employee_table3 have already been combined in the combined data. Each document is constituted by a token table and encoded data, as in FIG. 6A. In the FIGS. 6A and 6B example, the document whose part name is employee_table2 has an offset of 300 bytes, and the document whose part name is employee_table3 has an offset of 700 bytes.

The table map contains information for referencing the token tables already included in the combined data. In the present embodiment, the part name, offset from the head, and index of parts already saved are recorded in the table map.

As such, in the present embodiment, it is determined whether there is a reference in the table map to a token table that has not been checked, and if there is, the processing proceeds to step S405, having determined that there is a token table that has yet to be compared in the combined data. If there is not, the processing proceeds to step S407.

In step S405, a comparison process is performed to compare the token table A with the unchecked table. Assume that the token table that has not been checked at this time is a token table B. It is then checked whether there are any entries (vocabulary information entries) that are the same between the token table A and the token table B.

If there are none the same (step S405: NO), the processing returns to step S404, where it is confirmed whether there is an unchecked token table remaining in the table map. If there are entries that are the same (step S405: YES), the entries that are the same in the token table A are rewritten with references to the same entries in the token table B. In the present embodiment, dataroot, LASTNAME and Koizumi are entries that are the same, as shown in FIGS. 7A, 7B and 7C. These entries in employee_table2 and employee_table3 are thus rewritten with references to the corresponding entries in employee_table1.

Entries in a token table are described with data type/value pairs. In the case of dataroot, for example, a character string value "dataroot" is described with a character string type. As such, new types are defined as in FIG. 8, in order to describe references to other tables. FIG. 8 shows exemplary data type definitions. In the present embodiment, a tokenref type is defined as index=15 (f in hexadecimal). Token tables are rewritten using the tokenref type.

The rewritten token tables are as in FIGS. 9A, 9B and 9C. FIGS. 9A, 9B and 9C illustrate the rewriting of token tables. Here, index=1 of employee_table2 references index=1 of employee_table1. The tokenref type index, 0x0f, and the employee_table1 index, 0x01, are thus described. Again, index=5 of employee_table2 references index=4 of employee_table1. The tokenref type index, 0x0f, the employee_table1 index, 0x01, and also the index in the table, 0x04, are thus described. The index (04) in the table is further described because the indexes for "Koizumi" in the respective tables differ from one another. Rewriting is similarly performed for the other entries.

Thus, in steps S404 to S406, these token tables are combined in the case where vocabulary information included in a first token table (first correspondence information) is common with vocabulary information included in a second token table (second correspondence information). Specifically, processing is performed to replace the common vocabulary information included in the first token table with references to the common vocabulary information included in the second token table.

Once rewriting has been performed for all entries that are the same, the processing returns to step S404, where it is confirmed whether there is an unchecked token table remaining in the table map. If there are no longer any unchecked token tables (step S404: NO), in step S407, the token table A is combined with the combined document data (combined data).

Next, in step S408, a reference to the location at which the token table A has been saved (combined) is described in the table map, as in FIG. 6B. The index in the table map is used when describing a reference to a token table. For example, a reference to a token table is able to specify vocabulary information using document identification information that identifies a structured document. The offset is used when reading out a token table.

Figure 10:
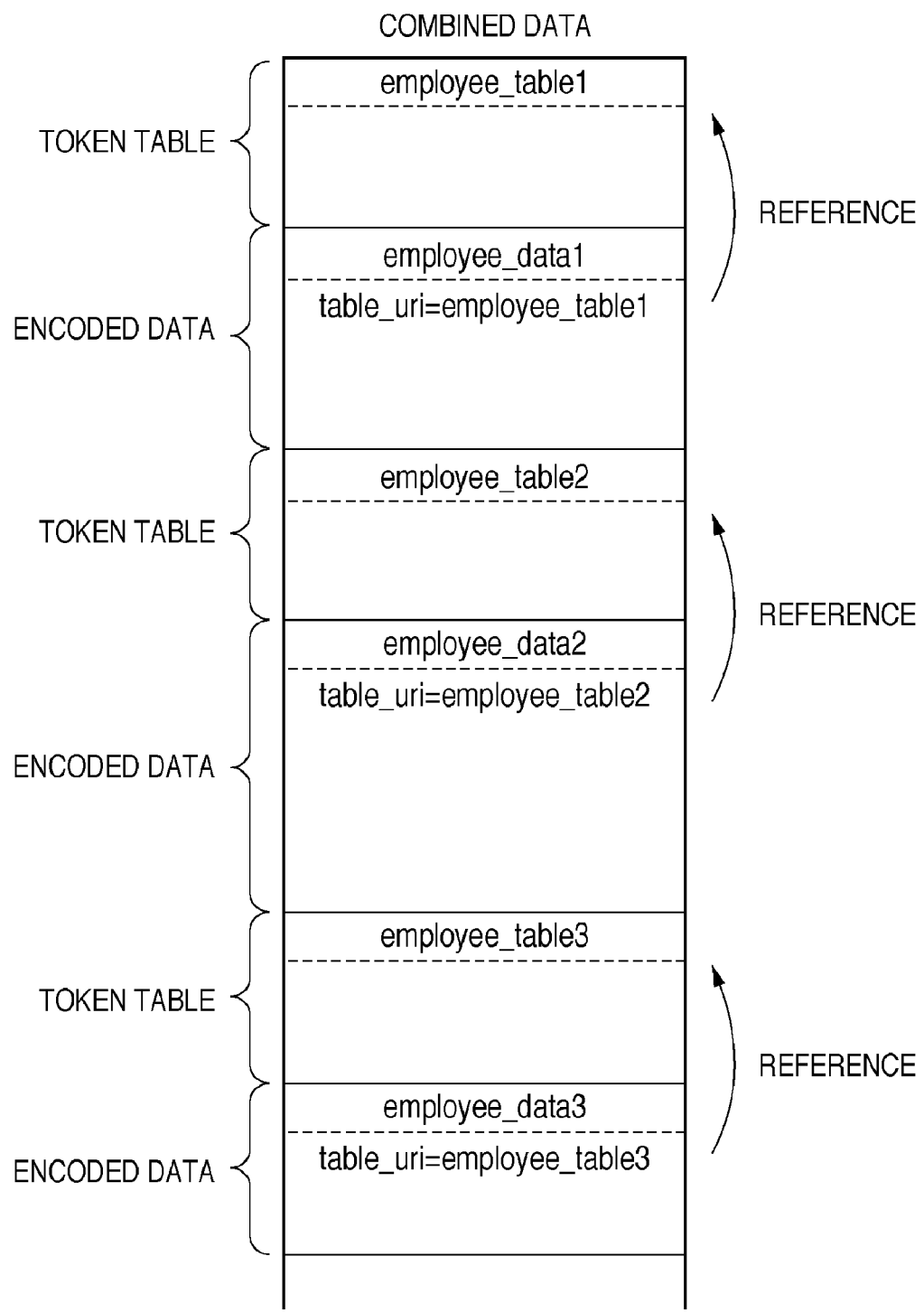
FIG. 10 illustrates the structure of combined data.

Next, in step S409, a reference to the location at which the token table A has been saved is described in the encoded data, as in FIG. 10, so that the encoded data is able to reference the token table A. FIG. 10 illustrates the structure of combined data. With binary XML, the reference destination can be described in encoded data in the case where the token table is referenced externally. A reference to the token table is described in this portion based on the table map in FIG. 6B.

Next, in step S410, the encoded data is saved as part of the combined data. Note that data can be combined based on the ZIP format, the MIME Mulitpart/Related format or the like, for example.

Subsequently, the processing of steps S401 to S410 is repeatedly executed for document data that is to be combined. The table map is saved when the combining process has ended. The table map may be saved by being included as part of the combined data, or may be saved in a separate file and referenced. As described above, the configuration according to the present embodiment enables the overall size of combined data to be decreased and redundancy of repeated description to be further reduced in the case where common vocabulary information is included in the token tables, since this common vocabulary information is integrated.

By implementing the proposal as described above, the over size of combined data can be decreased by avoiding redundancy as much as possible.

Embodiment 2

In the present embodiment, the case is considered where a portion of the combined data is deleted. With the configuration according to the present embodiment, a given token table references entries in another token table. However, in this case, data in the combined documents can no longer be read when a token table that was been referenced is deleted. In view of this, a portion of the data can be deleted in the following manner.

The configuration according to Embodiment 2 also executes processing in accordance with the flow of FIG. 4, similarly to Embodiment 1. With Embodiment 2, writing to a table map as in FIG. 11 is performed in step S406 when rewriting entries. FIG. 11 illustrates a table map. In the present embodiment, employee_table1 is referenced from employee_table2 and employee_table3, so references (0x02, 0x03) to these tables are written to a reference table item. Also, employee_table2 is referenced from employee_table3, so a reference (0x03) is written to the reference table item.

In other words, when generating a table map, a token table having vocabulary information that is referenced from another token table is described in the table map in association with the other token table. In the present embodiment, token tables are associated using the document identification information of corresponding structured documents.

When deleting a portion of the combined data, the table map of FIG. 11 attached to the combined data is confirmed. If it is desired to delete the second table data in the present embodiment, employee_table2 will be deleted. The table map reveals that employee_table2 is referenced from employee_table3. As such, employee_table3 is retrieved, and the reference to employee_table2 is replaced with "Yamamoto" because index=6 is doing the referencing.

In other words, the following processing is performed in the case where the token table corresponding to a designated structured document has vocabulary information that is referenced from another token table. Firstly, the location in which vocabulary information was replaced with a reference in the other token table is restored to the vocabulary information prior to replacement. Next, the location equivalent to the designated structured document is deleted from the combined data, after the vocabulary has been restored.

Thus, with the configuration according to the present embodiment, the location equivalent to a structured document corresponding to a token table referenced from another token table is deleted after restoring the reference in the other token table to vocabulary information. This enables a structured document to be restored from encoded data corresponding to this "other token table", since the correspondence between token information and vocabulary information is maintained even after the deletion process.

Embodiment 3

In the present embodiment, consideration is given to the case where the token table of given document data encompasses the token table of other document data. In this case, the data size when combining can be decreased as a result of one table referencing the entries of another table, as in Embodiment 1. However, one of the token tables is itself made unnecessary by performing the following processing, enabling data size to be further decreased.

Figure 12:
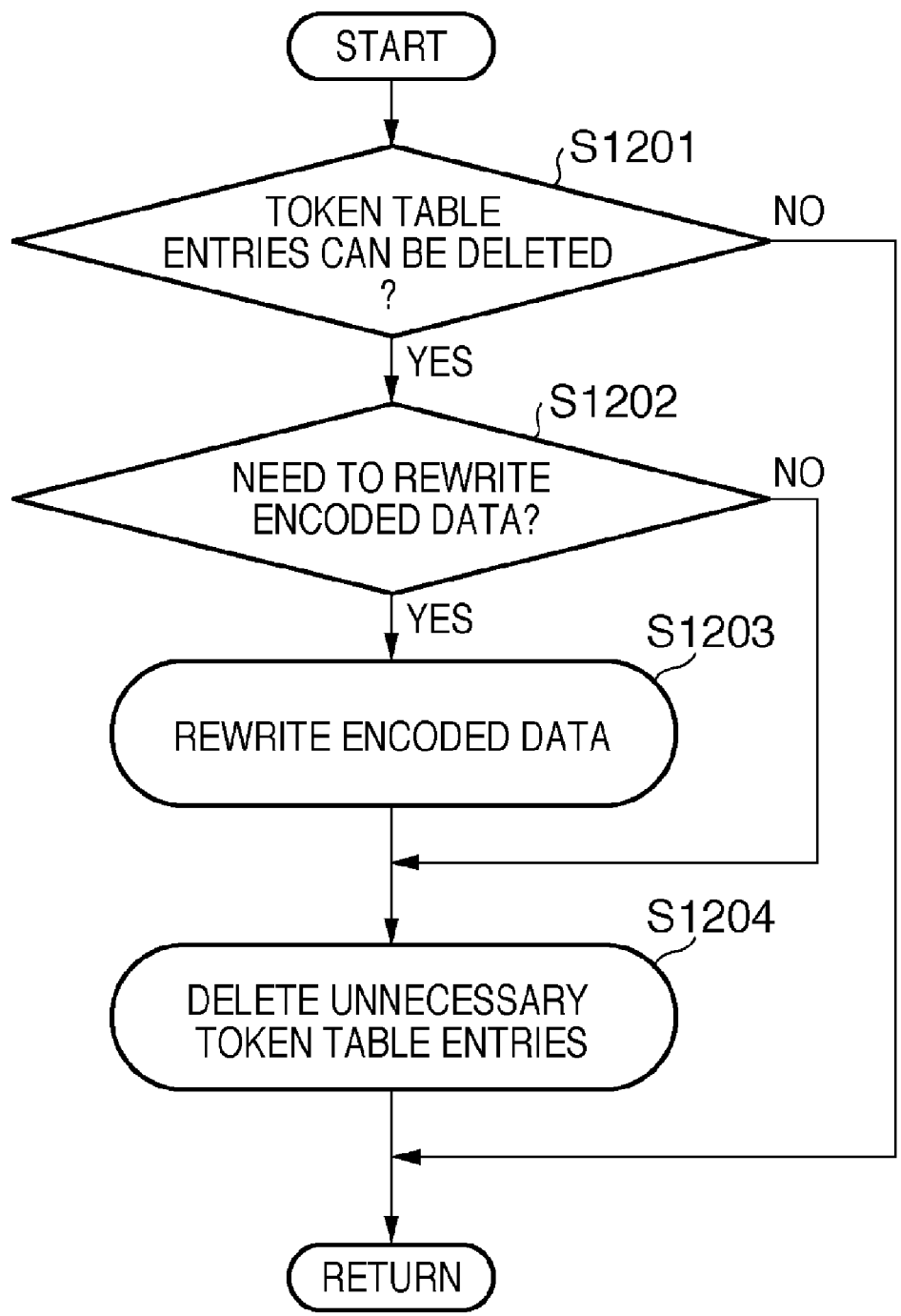
FIG. 12 is a flowchart showing the flow of a process of deleting an unnecessary token table.

The configuration according to the present embodiment also executes processing in accordance with the flow of FIG. 4, similarly to Embodiment 1. With Embodiment 3, however, processing in accordance with the flow of FIG. 12 is executed in step S406. FIG. 12 is a flowchart showing the flow of a process for deleting an unnecessary token table.

In step S1201, it is determined whether the entries of a token table can be deleted. As for the determination method, the vocabularies of the token tables compared, and if the vocabularies included in one table completely encompass the vocabularies included in another table, it is deemed that deletion is possible. It can also be deemed that deletion is possible if at least a certain fixed number of entries are encompassed, rather than the entries being completely encompassed. When it is determined that deletion is possible, the processing proceeds to step S1202, and if not, the processing returns to step S406.

FIGS. 13A and 13B show exemplary document data to be combined in the present embodiment. The vocabulary information in the token table of employee_table5 is encompassed in the token table of employee_table4. As such, it is determined in step S1201 that deletion is possible, and the processing proceeds to step S1202.

Next, in step S1202, it is determined whether encoded data needs to be rewritten. To delete the entries of one token table, it is necessary that the tokens for the vocabularies coincide in both tables. If they do not coincide, the encoded data is rewritten to make the tokens coincide. In the present embodiment, the token is the index. In FIGS. 13A and 13B, the vocabulary "Saitoh" in both tables does not have the same index, so the processing proceeds to step S1203, having determined that the encoded data needs rewriting.

In step S1203, the encoded data is rewritten. Firstly, those existing tokens that need to coincide in the tables are determined. Next, it is confirmed whether a conflict arises with other tokens in the table as a result of the determined tokens. If a conflict arises, an arbitrary token that is not duplicated is assigned to avoid the conflict. Once allocation is complete, the encoded data is decoded, the previous token is replaced with the new token, and the resultant data is encoded.

In the present embodiment, the token index=5 is allocated to "Saitoh". Because there is no conflict with the other existing tokens, the allocation is complete at this point. Data that has been re-encoded in accordance with the allocation is shown in FIGS. 14A and 14B. The code has changed from 0x83 to 0x85 as a result of the index changing from 3 to 5.

Figure 15:
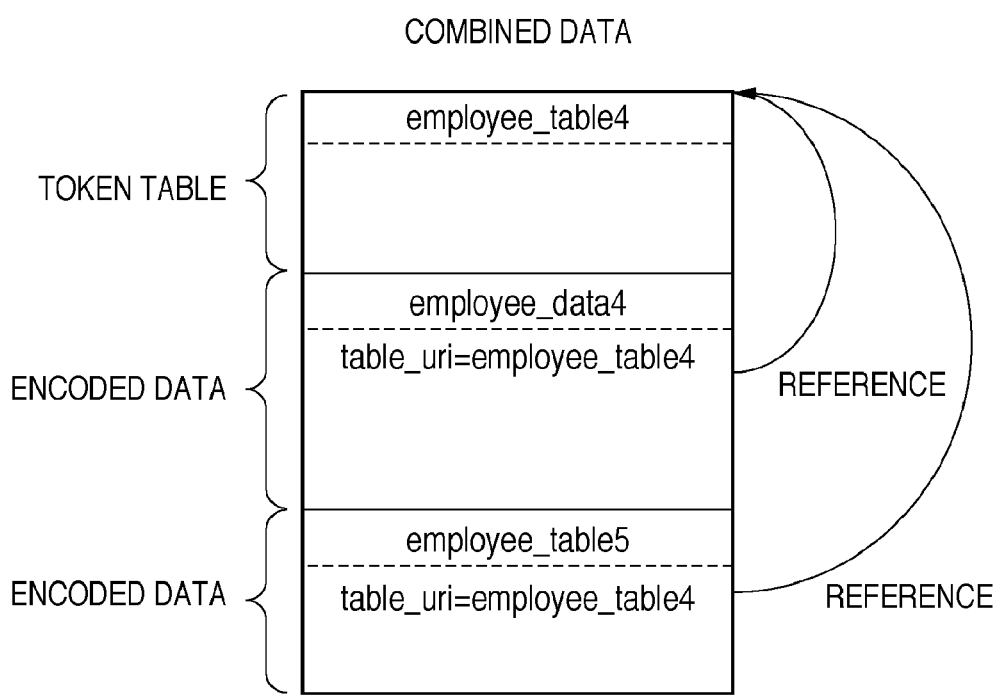
FIG. 15 shows an exemplary result of combining document data after deleting unnecessary table entries.

In step S1204, unnecessary table entries are then deleted, and the document data is combined. The result of the combining is shown in FIG. 15. The token table of employee_table5, being unnecessary, has been completely deleted, and employee_table5 has been written so as to reference the token table of employee_table4.

As described above, the present embodiment enables the overall data size to be further decreased by specifying and deleting unnecessary token tables when a plurality of token tables exist.

Additional Embodiments

Note that with the above configurations, token tables were always integrated if there was common vocabulary information, although the token tables need not be integrated if unnecessary. For example, if vocabulary information is replaced with a reference in the case where the bit length of the reference information is greater than the bit length of the vocabulary information prior to replacement, the size of the combined data will conversely increase as a result of the replacement. Thus, if the bit length of reference information is greater than the bit length of vocabulary information prior to replacement, of if the bit length of reference information exceeds a fixed length, the vocabulary information in the token table need not be replaced.

If the position of the reference destination of a token table in combined data is removed from the position of the reference origin, it may take time to browse the token tables when decoding combined data. Thus, if the distance between the positions of the reference destination and the reference origin in combined data is greater than or equal to a fixed distance, replacement of vocabulary information need not be performed.

While embodiments of the present invention have been detailed above, the object of the present invention is, needless to say, also achieved by executing the program code of software that realizes the functions of the foregoing embodiments in a system or apparatus. In this case, the program code itself realizes the functions of the foregoing embodiments, and this program code is included within the technical scope of the present invention.

The program code can be supplied to the system or apparatus by being recorded to a computer-readable storage medium, for example. A computer (or CPU or MPU) in the system or apparatus can also achieve the object of the present invention by reading out and executing the program code stored in the storage medium. Accordingly, the storage medium storing this program code is also included within the technical scope of the present invention.

Storage media that can be used for supplying the program code include, for example, flexible disk, hard disk, optical disk, magneto-optical disk, CD-ROM, CD-R, magnetic tape, nonvolatile memory card, ROM, and DVD.

Moreover, the program code need not have all of the elements for realizing the functions of the foregoing embodiments as a result of a computer reading out and executing the program code. That is, program code that achieves the object in coordination with at least one of software or hardware incorporated in a computer is also included.

For example, a CPU or the like provided in a function expansion board or a function expansion unit inserted into or connected to a computer may perform part or all of the actual processing based on instructions in the program code, with the functions of the foregoing embodiments being realized as a result of this processing. The program code in such a case is also included within the technical scope of the present invention. Note that the function expansion board or the function expansion unit is able to perform such processing by reading the program code to a memory provided therein and executing the read program code.

According to the foregoing configurations, duplication in token tables created with structured documents is standardized in document data obtained by combining a plurality of structured documents into one. This enables redundancy of repeated description between structured documents to be reduced, and size reduction of word processing documents and the like to be realized.

According to the present invention, a technique is provided that enables redundancy of repeated description to be further reduced when combining a plurality of structured documents.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-298596, filed on Nov. 16, 2007 and 2008-233684 filed Sep. 11, 2008, which are hereby incorporated by reference herein in their entirety.

What is claimed is:

1. An information processing apparatus including at least one processor and memory communicatively coupled via a bus for combining a plurality of binary XML documents, comprising:

an input unit configured to input the plurality of binary XML documents, wherein each of the plurality of binary XML documents includes correspondence information showing a correspondence between vocabulary information constituting the binary XML document and token information, and encoded information in which the vocabulary information included in the binary XML document has been replaced with corresponding token information based on the correspondence information;

a first determination unit adapted to determine whether first correspondence information included in a first binary XML document and second correspondence information included in a second binary XML document includes common vocabulary information;

a second determination unit adapted to determine whether the two token information for the common vocabulary information coincide with each other, if the first determination unit determines that the first correspondence information and the second correspondence information includes common vocabulary information;

a replacing unit configured to replace encoded information of the second binary XML document using the token information included in the first correspondence information, if the second determination unit determines that the two token information do not coincide with each other;

a deletion unit adapted to delete the token information and the vocabulary information corresponding to the token information which are included in the second correspondence information; and a combining unit configured to generate combined information by combining the correspondence information in which the common vocabulary information has been replaced and the encoded information, of each of the plurality of binary XML documents.

2. The information processing apparatus according to claim 1, further comprising a generating unit configured to generate mapping information showing, for each of the plurality of binary XML documents, document identification information identifying the binary XML document and a position of the binary XML document in the combined information, wherein the reference with which the vocabulary information is replaced by the replacing unit specifies the vocabulary information using the document identification information, and the combining unit further combines the mapping information with the combined information.

3. The information processing apparatus according to claim 2, wherein the generating unit describes the correspondence information having vocabulary information that is referenced from other correspondence information in the mapping information in association with the other correspondence information.

4. The information processing apparatus according to claim 1, wherein the combining unit is configured to combine the correspondence information and encoded information of the plurality of structured documents, based on a ZIP format or a MIME Multipart/Related format.

5. A control method of an information processing apparatus including at least one processor and memory communicatively coupled via a bus for combining a plurality of binary XML documents, comprising:

an inputting step of inputting, the plurality of binary XML documents, wherein each of the plurality of binary XML documents includes correspondence information showing a correspondence between vocabulary information constituting the binary XML document and token information, and encoded information in which the vocabulary information included in the binary XML document has been replaced with corresponding token information based on the correspondence information;

a first determining step of determining whether first correspondence information included in a first binary XML document and second correspondence information included in a second binary XML document includes common vocabulary information;

a second determining step of determining whether the two token information for the common vocabulary information coincide with each other, if it is determined in the first determining step that the first correspondence information and the second correspondence information includes common vocabulary information;

a replacing step of replacing encoded information of the second binary XML document using the token information included in the first correspondence information, if it is determined in the second determining step that the two token information do not coincide with each other;

a deleting step of deleting the token information and the vocabulary information corresponding to the token information which are included in the second correspondence information; and a generating step of generating combined information by combining the correspondence information in which the common vocabulary information has been replaced and the encoded information, of each of the plurality of binary XML documents.

6. A computer-readable storage medium storing a computer-executable process, the computer-executable process causing a computer to perform a control method of an information processing apparatus for combining a plurality of binary XML documents, comprising:

an inputting step of inputting, the plurality of binary XML documents, wherein each of the plurality of binary XML documents includes correspondence information showing a correspondence between vocabulary information constituting the binary XML document and token information, and encoded information in which the vocabulary information included in the binary XML document has been replaced with corresponding token information based on the correspondence information;

a first determining step of determining whether first correspondence information included in a first binary XML document and second correspondence information included in a second binary XML document includes common vocabulary information;

a replacing step of replacing encoded information of the second binary XML document using the token information included in the first correspondence information, if it is determined in the second determining step that the two token information do not coincide with each other;

a deleting step of deleting the token information and the vocabulary information corresponding to the token information which are included in the second correspondence information; and a generating step of generating combined information by combining the correspondence information in which the common vocabulary information has been replaced and the encoded information, of each of the plurality of binary XML documents.

* * * * *